United States Patent
Brown et al.

(10) Patent No.: US 11,216,061 B2
(45) Date of Patent: Jan. 4, 2022

(54) METHODS AND APPARATUS FOR INTERFACING BETWEEN POWER DOMAINS

(71) Applicant: Arm Limited, Cambridge (GB)

(72) Inventors: Dominic William Brown, Cambridge (GB); Christopher Vincent Severino, Cambridge (GB)

(73) Assignee: Arm Limited, Cambridge (GB)

( * ) Notice: Subject to any disclaimer, the term of this patent is extended or adjusted under 35 U.S.C. 154(b) by 77 days.

(21) Appl. No.: 16/521,671

(22) Filed: Jul. 25, 2019

(65) Prior Publication Data

US 2021/0026439 A1    Jan. 28, 2021

(51) Int. Cl.
 *G06F 1/3296*    (2019.01)
 *G06F 1/3206*    (2019.01)

(52) U.S. Cl.
 CPC .......... *G06F 1/3296* (2013.01); *G06F 1/3206* (2013.01)

(58) Field of Classification Search
 CPC .............................. G06F 1/3296; G06F 1/3206
 See application file for complete search history.

(56) References Cited

U.S. PATENT DOCUMENTS

| | | | |
|---|---|---|---|
| 6,105,097 A * | 8/2000 | Larky ................... | G06F 1/3215 710/314 |
| 6,272,644 B1 * | 8/2001 | Urade ................... | G06F 1/3203 713/320 |
| 7,165,729 B2 | 1/2007 | Bradley et al. | |
| 7,779,195 B2 * | 8/2010 | Motomura .............. | G06F 13/36 710/313 |
| 7,866,560 B2 | 1/2011 | Woodhouse et al. | |
| 8,332,676 B2 * | 12/2012 | Lyra ...................... | G06F 13/102 713/323 |
| 10,299,219 B2 | 5/2019 | Flynn | |
| 10,628,371 B1 * | 4/2020 | Liu ...................... | G06F 13/4022 |
| 10,788,886 B2 * | 9/2020 | Brown .................. | G06F 1/3215 |
| 2007/0124621 A1 * | 5/2007 | Kim ...................... | G06F 1/3203 713/323 |
| 2009/0216981 A1 * | 8/2009 | Diefenbaugh ........ | G06F 13/385 711/163 |

(Continued)

*Primary Examiner* — Vincent H Tran
(74) *Attorney, Agent, or Firm* — Nixon & Vanderhye P.C.

(57) ABSTRACT

Aspects of the present disclosure relate to power bridge circuitry comprising a first interface configured to interface with a source power domain; a second interface configured to interface with a target power domain; transition circuitry to receive a transition indication that the power bridge circuitry is to transition to an idle state; communication circuitry to communicate messages between the interfaces; and message identification circuitry to identify messages communicated by the communication circuitry, the identification circuitry being configured to detect the communication of a given message directed to a target component connected to the second interface and indicating cessation of communication between the target component and a source component connected to the first interface. The transition circuitry is configured, responsive to receiving the transition indication and responsive to the message identification circuitry detecting communication of the given message, to initiate a transition of the power bridge circuitry to the idle state.

20 Claims, 5 Drawing Sheets

(56) References Cited

U.S. PATENT DOCUMENTS

| | | | |
|---|---|---|---|
| 2009/0279473 A1* | 11/2009 | Lu | G09G 5/12 370/315 |
| 2012/0084592 A1* | 4/2012 | Lin | G06F 1/266 713/324 |
| 2012/0089851 A1* | 4/2012 | Ting | G06F 1/3206 713/310 |
| 2012/0124252 A1* | 5/2012 | Kayama | G06F 13/4282 710/32 |
| 2012/0260116 A1* | 10/2012 | Chen | G06F 1/3221 713/324 |
| 2012/0297222 A1* | 11/2012 | Lin | H04L 12/10 713/320 |
| 2014/0025979 A1* | 1/2014 | Yagi | G06F 1/3293 713/323 |
| 2016/0253273 A1* | 9/2016 | Lin | G06F 1/3203 710/63 |
| 2016/0253280 A1* | 9/2016 | Saito | G06F 1/325 710/313 |
| 2017/0017294 A1* | 1/2017 | Myouga | G06F 13/4295 |
| 2017/0185100 A1* | 6/2017 | Nguyen | G06F 13/4027 |
| 2018/0120926 A1* | 5/2018 | Brown | G06F 1/3296 |
| 2020/0183866 A1* | 6/2020 | Hindle | G06F 13/24 |

* cited by examiner

METHODS AND APPARATUS FOR INTERFACING BETWEEN POWER DOMAINS

BACKGROUND

The present technique relates to the field of power bridge circuitry for providing a bridge between components, such as processing circuitry components, in different power domains. Each such power domain can be subjected to power control independently. For example, one power domain can be powered down while another domain operates at full power. Power bridge circuitry can facilitate such domain-specific power control by, for example, facilitating communication of messages associated with power control between components in different domains.

SUMMARY

At least some examples provide an interconnect apparatus comprising:
a first interface configured to interface with a source power domain;
a second interface configured to interface with a target power domain;
transition circuitry to receive a transition indication that the power bridge circuitry is to transition to an idle state;
communication circuitry to communicate messages between the first interface and the second interface;
message identification circuitry to identify messages communicated by the communication circuitry, the message identification circuitry being configured to detect the communication of a given message, the given message being directed to a target component connected to the second interface and indicating cessation of communication between the target component and a source component connected to the first interface,
wherein the transition circuitry is configured, responsive to receiving the transition indication and responsive to the message identification circuitry detecting the communication of the given message, to initiate a transition of the power bridge circuitry to the idle state. Further examples provide a system comprising:
power bridge circuitry comprising:
a first interface configured to interface with a source power domain;
a second interface configured to interface with a target power domain;
transition circuitry to receive a transition indication that the power bridge circuitry is to transition to an idle state; and
communication circuitry to communicate messages between the first interface and the second interface,
a source component connected to the first interface; and
a target component connected to the second interface, wherein:
the power bridge further comprises message identification circuitry to identify messages communicated by the communication circuitry, the message identification circuitry being configured to detect the communication of a given message, the given message being directed to the target component and indicating cessation of communication between the target component and the source component; and
the transition circuitry is configured, responsive to receiving the transition indication and responsive to the message identification circuitry detecting the communication of the given message, to initiate a transition of the power bridge circuitry to the idle state. Further examples provide a method comprising:
communicating messages between a source component in a source power domain and a target component in a target power domain;
receiving a request to transition to an idle state;
detecting the communication of a given message, the given message being received from the source component and directed to the target component, as indicating cessation of communication between the target component and the source component; and
responsive to receiving the request and to detecting the given message, initiating a transition to the idle state.

Further aspects, features and advantages of the present technique will be apparent from the following description of examples, which is to be read in conjunction with the accompanying drawings.

DESCRIPTION OF EXAMPLES

Figure 1:
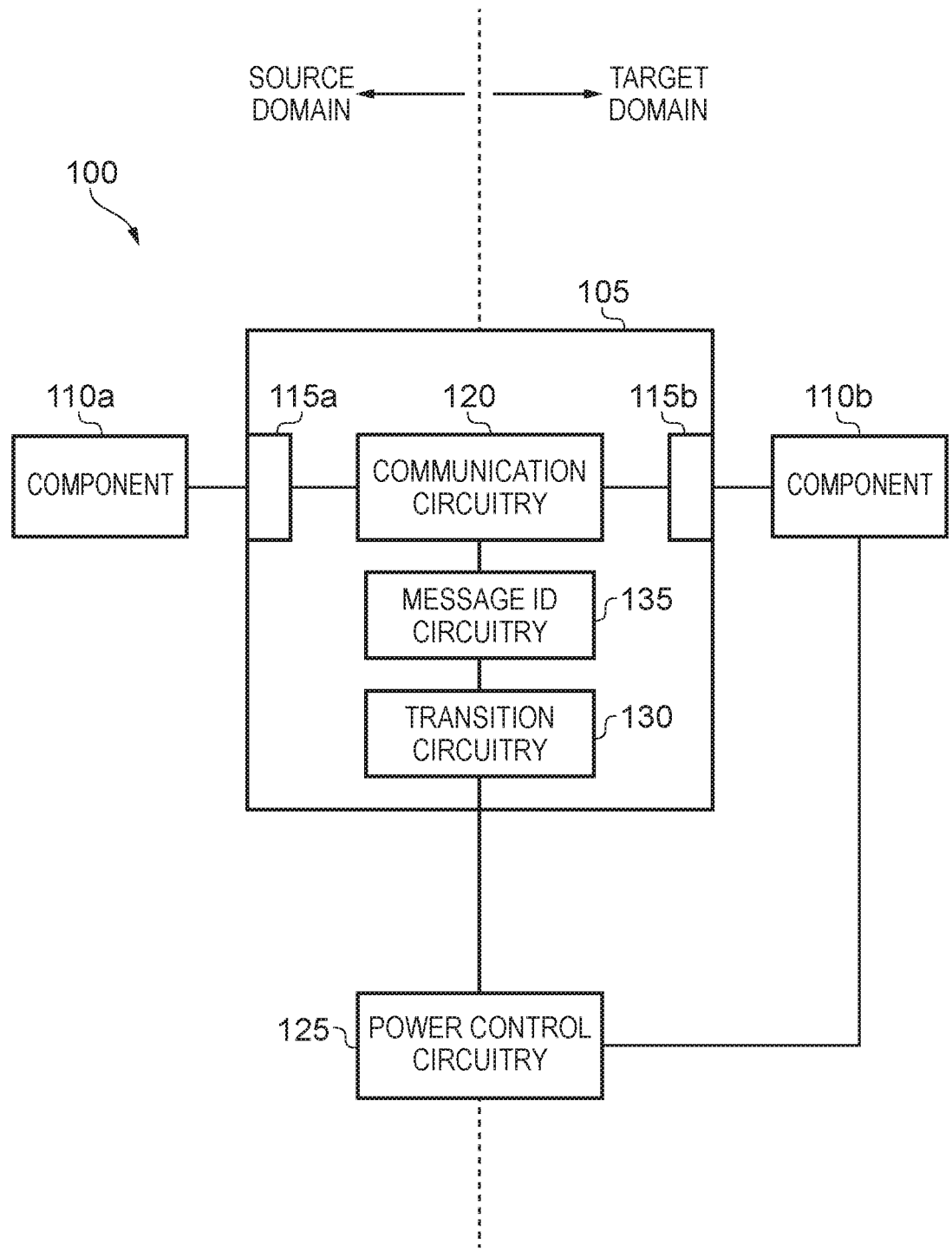
FIG. 1 schematically shows a system according to aspects of the present disclosure.

As noted above, power bridge circuitry that provides a bridge between power domains can facilitate domain-specific power control, such as the powering down of one domain. Power bridge circuitry according to one example comprises a first interface configured to interface with a source power domain and a second interface configured to interface with a target power domain. A component in the source power domain may communicate, via the power bridge circuitry, with a component in the target power domain. For example, a hub component in the source power domain may communicate with a satellite component in the target power domain. The description of the present example in terms of "source" and "target domains" is for the purpose of illustrating an example operation of the power bridge: the status of each domain as "source" or "target" is not fixed or permanent but should instead be understood as a functional labelling of the domains.

The power bridge circuitry comprises communication circuitry to communicate messages between the first interface and the second interface. The communication circuitry thus provides for communication of messages between components of the source domain and components of the target domain.

The power bridge circuitry comprises transition circuitry to receive a transition indication that the power bridge circuitry is to transition to an idle state. The transition indication may for example be received from power control circuitry external to the power bridge circuitry. The transition to the idle state may be occasioned by an intention to transition the target power domain from a higher-power state to a lower-power state such as an inactive state. Thus, the transition indication may indicate a request (for example from power control circuitry to one or more components in the target domain) to transition the target power domain to the lower-power state, i.e. to power down the target power domain.

The power bridge circuitry comprises message identification circuitry to identify messages communicated by the communication circuitry (for example messages between components in the source and target domains). The message identification circuitry is configured to detect the communication of a given message, the given message being directed to a target component connected to the second interface (i.e. in the target domain) and indicating cessation of communication between the target component and a source component connected to the first interface (i.e. in the source domain). The given message may for example serve to confirm to the target component that no further messages will be communicated to it from the source component, such that the target component is permitted to power down.

In an example, the target component may communicate a disconnection request message, via the power bridge circuitry, to the source component. This may for example be responsive to the target component receiving an indication that the target domain is to be powered down. The given message may be a disconnection acceptance message, issued by the source component responsive to receiving the disconnection request message. In some examples, the disconnection acceptance is indicated over several messages, such that the message identification circuitry is configured to track the receipt of such messages to determine whether they form a single overall indication of disconnection acceptance. The target component can thus, having received the indication that it is to power down, request disconnection from the source component. The source component can then, when it has no further messages to communicate to the target component, accept the request. The power bridge circuitry detects this acceptance as indicating that communication of messages has ceased, thereby confirming that the power bridge circuitry can safely transition to the idle state.

The aforementioned transition circuitry is configured, responsive to receiving the transition indication and responsive to the message identification circuitry detecting the communication of the given message, to initiate a transition of the power bridge circuitry to the idle state. The powering down of the target domain and the power bridge circuitry can thus be handled such that outstanding messages can be communicated between the source and target components as appropriate prior to the powering down, thereby allowing for a controlled power down procedure with a reduced risk of error.

In an example, the transition circuitry is responsive to receiving the transition indication, and to the message identification circuitry identifying the given message, to transmit to power control circuitry a transition acknowledgement message to confirm that the target power domain is to transition from the higher-power state to the lower-power state. This serves to confirm to the power control circuitry that the target and source components have ceased communication and, consequently, that the power control circuitry can proceed to control the process of powering down the target component (and any other components in the target domain).

In some examples, the source and/or target domains include further components. For example, the target domain may comprise a second target component connected to the second interface of the power bridge circuitry. In one such example, the message identification circuitry is configured to detect the communication of a further given message, the further given message being directed to the second target component and indicating cessation of communication between the second target component and the source component. The transition circuitry is then additionally responsive to the message identification circuitry detecting the communication of the second message to initiate the transition of the power bridge circuitry to the idle state. This can be extended to any number of target components in the target domain, such that the present example can be extended to provide for efficient and effective powering down of an arbitrarily large target power domain.

In one such example in which the target domain comprises a second target component, the power bridge circuitry comprises connection tracking circuitry to determine connection information indicative of whether the target component has ceased communication with the source component and whether the second target component has ceased communication with the source component. This connection information may be a count of a number of target components that have an un-ceased (i.e. active) communication session with the source component. For example, the count may be initialised at zero when the source domain is powered up, and subsequently incremented and decremented as communication sessions with target components are started and stopped. The power bridge circuitry can thus maintain an indication of the active communication sessions between the source domain and target domain that are being serviced via the power bridge.

The transition circuitry may then be responsive to the connection information indicating that the target component has ceased communication with the source component, and that the second target component has ceased communication with the source component, to initiate the transition of the power bridge circuitry to the idle state. It can thus be ensured, prior to transitioning the power bridge circuitry to the idle state, that no active communication sessions are taking place between the source domain and target domain via the power bridge circuitry.

In some examples in which the target domain comprises a target component and a second target component, messages between the source component and the target component are associated with a first communication protocol and messages between the source component and the second target component are associated with a second communication protocol, the second communication protocol being different to the first communication protocol. In such examples, the message identification circuitry may comprise communication protocol interpretation circuitry configured to detect the given message and the further given message. The message identification circuitry can thus identify messages in either of the first and second communication protocols.

More generally, where the target domain comprises multiple target components, one or more target components may use a first communication protocol, one or more may use a second communication protocol, one or more may use a third communication protocol, and so on for any number of communication protocols. As described above, the message identification circuitry may comprise communication protocol interpretation circuitry such that messages in any of these communication protocols can be identified.

In an example the transition circuitry is responsive to a lack of receipt of the given message, within a predetermined time after receiving the transition indication, to reject the transition to the idle state. The transition circuitry may reject the transition by transmitting a transition rejection message to power control circuitry. The transition request can thus be denied if the active communication sessions do not cease, thereby maintaining the power bridge circuitry in an active state to service the active communication sessions.

In an example, the power bridge circuitry comprises storage to store received data, and the message identification circuitry is configured to detect the given message by detecting whether given stored data corresponds the given message. For example, the storage may be a buffer in which communicated messages are stored whilst they are analysed by the message identification circuitry. The storage may be arranged in parallel with the communication circuitry such that the message identification circuitry is configured to perform said detecting in parallel with the communication of messages by the communication circuitry. The communication of messages can thus proceed without being impeded or blocked by the detecting.

In an example, the transition circuitry is responsive to receiving the transition indication to block communication by the communication circuitry of subsequent messages between the target component and the source component, other than messages associated with the ceasing of communication between the target component and the source component. Thus, once the power bridge circuitry has been requested to transition to the idle state, it can facilitate the ceasing of communication (whereby to allow the powering down of the target domain to proceed), whilst blocking unrelated communications which could prolong or prevent the powering down. The likelihood that the powering down can proceed (and that it can proceed in a timely fashion) is thus improved.

Examples of the present disclosure will now be described with reference to the drawings.

FIG. 1 schematically shows a system 100 according to aspects of the present disclosure. The system 100 comprises power bridge circuitry 105 which provides a bridge between a source power domain (to the left of the bridge 105 in FIG. 1) and a target power domain (to the right of the bridge 105 in FIG. 1). The system 100 further comprises a source component 110a in the source domain, and a target component 110b in the target domain. The source component 110a may for example be a system memory management unit translation control unit (sMMU TCU). The target component 110b may for example be a system memory management unit translation buffer unit (sMMU TBU).

The power bridge 105 comprises a first interface 115a configured to interface with the source component 110a (and any other components in the source domain). The power bridge 105 further comprises a second interface 115b configured to interface with the target component 110b (and any other components in the target domain). The power bridge comprises communication circuitry 120 for communicating messages between the first interface 115a and the second interface 115b. The power bridge 105 is thus configured to communicate messages between the source component 110a and the target component 110b, via the first interface 115a, communication circuitry 120 and second interface 115b.

The system 100 comprises power control circuitry 125 configured to issue power control commands in relation to the power bridge 105, source domain and target domain. For example, power domains may be powered up and down, and the power bridge 105 may be transitioned to an idle state when it is not to be used (for example because one or both of the power domains is powered down). The functionality of the system 100 in relation to such a powering down will be described in terms of the target domain being powered down and the power bridge 105 being transitioned to an idle state (because whilst the target domain is powered down, no messages can be communicated to the target component 110b).

The power control circuitry 125 issues a power control command to the target component 110b to instruct the target component 110b to power down. The power control circuitry also transmits a transition indication to the power bridge 105 to indicate that the power bridge circuitry 105 is to transition to the idle state.

The power bridge circuitry 105 comprises transition circuitry 130 to receive the transition indication.

The power bridge circuitry 105 comprises message identification circuitry 135 to identify messages communicated by the communication circuitry 120. The message identification circuitry 135 may operate continuously while the power bridge circuitry is active. Alternatively, the message identification circuitry 135 may save power by being inactive until the transition indication is received by the transition circuitry 130.

In response to receiving the power control command, the target component 110b transmits to the source component 110a, via the power bridge 105, a disconnection request message to request cessation of the communication session between the target component 110b and the source component 110a. In response, the source component 110a transmits to the target component 110b a disconnection acceptance message, indicating that no further messages are to be transmitted to the target component 110b and thus that the communication session has ceased.

The message identification circuitry 135 is configured to detect communication of the disconnection acceptance message from the source component 110a to the target component 110b. By detecting the disconnection acceptance message, the power bridge 105 can thus detect that communication between the source component 110a and target component 110b has ceased such that no further messages are to be communicated via the power bridge 105 (at least whilst the target domain remains powered down).

Once the transition circuitry 130 has received the transition indication from the power control circuitry 125, and the message identification circuitry 135 has detected the disconnection acceptance message, the transition circuitry 130 initiates a transition of the power bridge 105 to the idle state. It is thus ensured that the transition to the idle state does not occur until communication between the source component 110a and target component 110b has ceased. Such premature transitioning could prevent proper functioning of the power-down procedure, because the disconnection request and disconnection acceptance messages would not be communicated. This could cause a functional failure of the entire system.

Figure 2A:
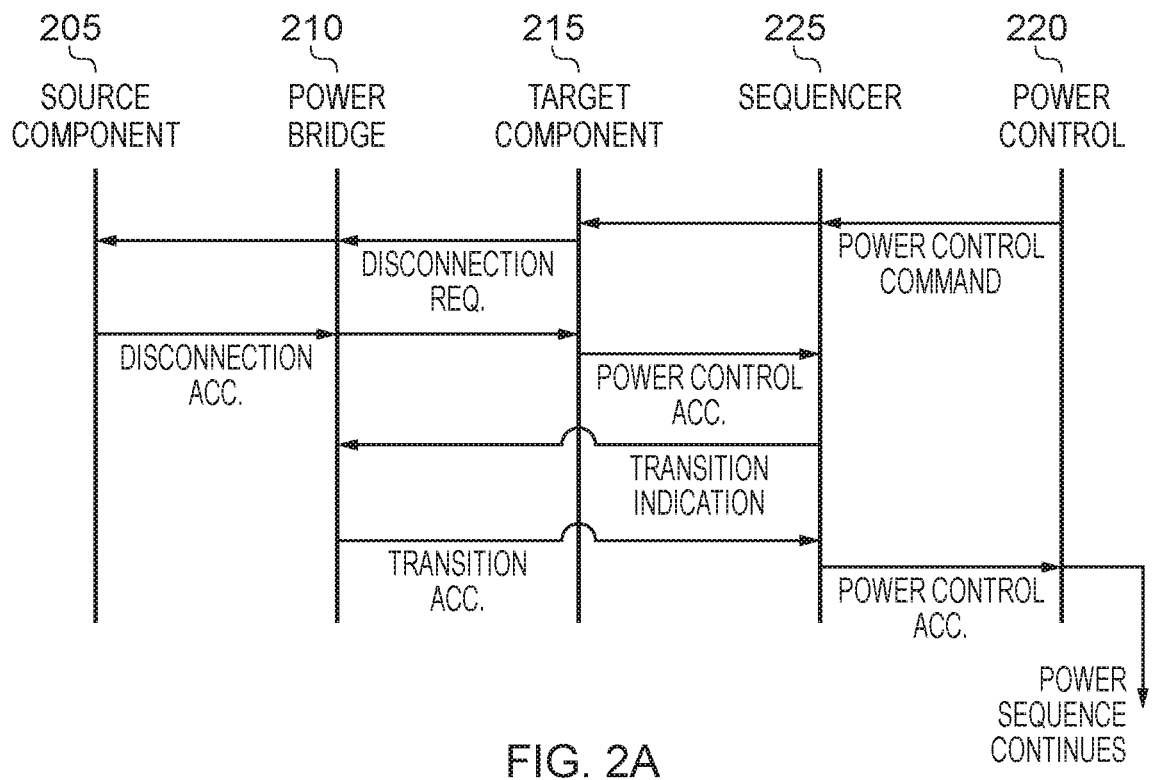
FIG. 2A schematically illustrates communication flow in a comparative system that does not implement examples of the present disclosure.

FIG. 2A schematically illustrates communication flow in a comparative system that does not implement examples of the present disclosure. The comparative system comprises a target component 215, power bridge 210, source component 205 and power control 220, which have the same general purpose as the analogous components described above in relation to FIG. 1. However, the power bridge does not comprise message identification circuitry 135 and thus has no ability to detect or identify particular messages that are communicated between the target component 215 and the source component 205. At the start of the illustrated flow, the source component 205 and the target component 215 have an open communication session via the power bridge 210. The source component 205 may for example be a system memory management unit translation control unit (sMMU TCU). The target component 215 may for example be a system memory management unit translation buffer unit (sMMU TBU).

In order to ensure that the power bridge 210 is not transitioned to the idle state whilst an active communication session is in place between the source component 205 and target component 215, the comparative system includes a sequencer 225, the operation of which is described below. The sequencer may for example be a low power distributor Q-channel (LPD-Q) sequencer.

The power control 220 determines that the target power domain including the target component 215 is to be powered down. The power bridge is thus to be transitioned to the idle state. The power control 220 issues a corresponding power control command to the sequencer 225. The power control command may be a Q-channel quiescent request.

The sequencer 225 forwards the power control command to the target component 215. Based on this, the target component 215 transmits a disconnection request, via the power bridge 210, to the source component 205, to request disconnection of the open communication session between the source component 205 and the target component 215.

The source component 205 performs any actions that are to be performed in advance of disconnecting from the target component 215 (for example transmitting any outstanding messages). The source component 205 then transmits a disconnection acceptance message, via the power bridge 210, to the target component 215. Responsive to this, the target component 215 transmits a power control acceptance message to the sequencer to confirm that the communication session has ceased and thus that no further messages will be transmitted via the power bridge 210.

Following receipt of the power control acceptance message, the sequencer 225 transmits a transition indication to the power bridge 210, to indicate that the power bridge 210 is to transition to the idle state. The transition indication may be a Q-channel quiescent request. In response to this, the power bridge 210 initiates the transition to the idle state and transmits a transition acceptance to the sequencer 225.

When the sequencer 225 has received the transition acceptance, it transmits a power control acceptance message to the power control 220 to confirm that the power control 220 can safely proceed with the power sequence of powering down the target domain.

The comparative system thus does allow assurance that the power bridge will not transition to the idle state whilst there is an open communication session, but in order to facilitate this it utilises a sequencer 225 that is not included in examples of the present disclosure. Examples of the present disclosure thus allow operation without such a sequencer, thereby reducing the complexity of the system as well as the incurred silicon and power resources. The lack of use of a sequencer also allows faster operation, thereby allowing more efficient entry to and exit from low power states. The power state transitions thus take less time, and incur less power, than in comparative examples in which a sequencer is used.

Figure 2B:
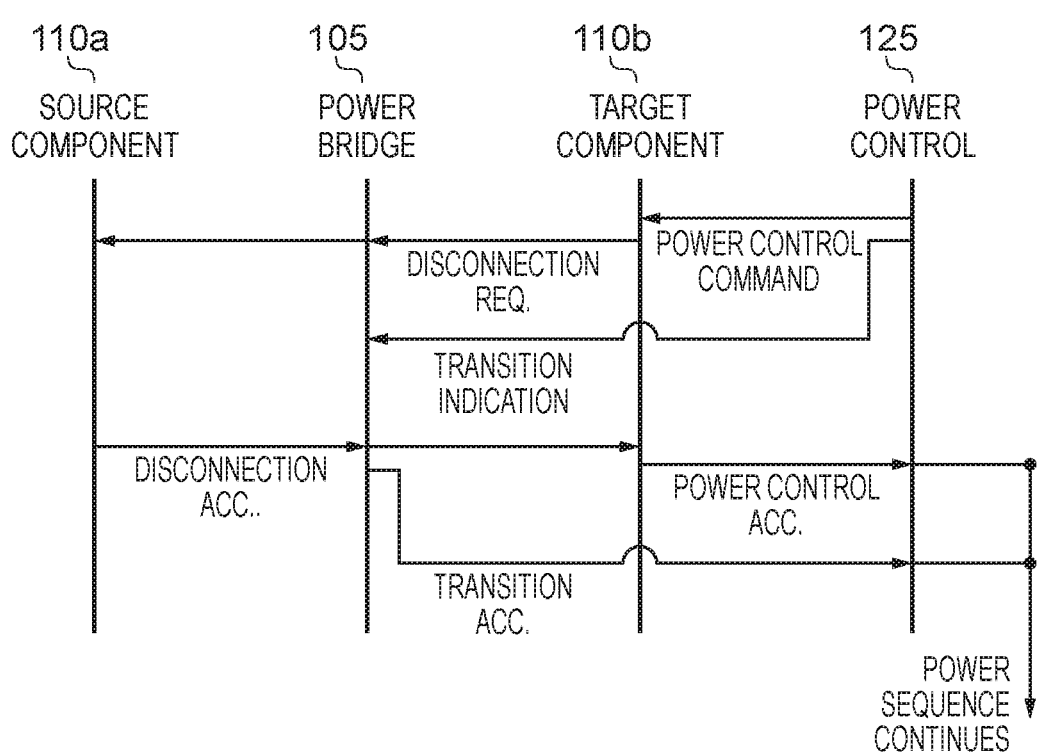
FIG. 2B schematically illustrates communication flow in a system according to examples of the present disclosure.

FIG. 2B schematically illustrates communication flow in a system according to examples of the present disclosure, such as the system 100 of FIG. 1. The communication flow is described in terms of transmissions between the target component 110b, power bridge 105, source component 110a and power control 125 of the system 100, but analogous communication flow can be implemented in other similar systems. At the start of the illustrated flow, the source component 110a and target component 110b have an open communication session via the power bridge 105.

The power control 125 determines that the target power domain including the target 110b is to be powered down. The power bridge is thus to be transitioned to the idle state. The power control 125 issues a corresponding power control command to the target component 110b and a transition indication to the power bridge 105. The power control command and transition indication may be Q-channel quiescent requests.

In response to receiving the power control command, the target component 110b transmits a disconnection request, via the power bridge 105, to the source component 110a, to request disconnection of the open communication session between the source component 110a and the target component 110b.

The source component 110a performs any actions that are to be performed in advance of disconnecting from the target component 110b (for example transmitting any outstanding messages). The source component 110a then transmits a disconnection acceptance message, via the power bridge 105, to the target component 110b. Following receipt of the disconnection acceptance message, the target component 110b transmits a power control acceptance message to the power control 125 to confirm that it can be powered down.

Having received the transition indication, the power bridge 105 identifies transmissions between the source component 110a and the target component 110b, with the aim of detecting transmission of the disconnection acceptance. When the disconnection acceptance is detected, the power bridge 105 transitions to the idle state and transmits a transition acceptance message to the power control 125, to indicate the transition to the idle state.

When the power control 125 has received the power control acceptance from the target component 110b, and the transition acceptance from the power bridge 105, it proceeds with the power sequence of powering down the target domain.

The present disclosure thereby provides for assurance that the power bridge will not transition to the idle state whilst there is an open communication session, such that domains can be powered down without error, without utilising an additional sequencer component 225 as in the comparative example described above in relation to FIG. 2A. The present disclosure thereby provides a reduction in complexity, as well as a reduction in the incurred silicon and power resources. As noted above, the lack of use of a sequencer also allows faster operation, thereby allowing more efficient entry to and exit from low power states. The time and power for transitioning between power states is thus reduced.

Figure 3:
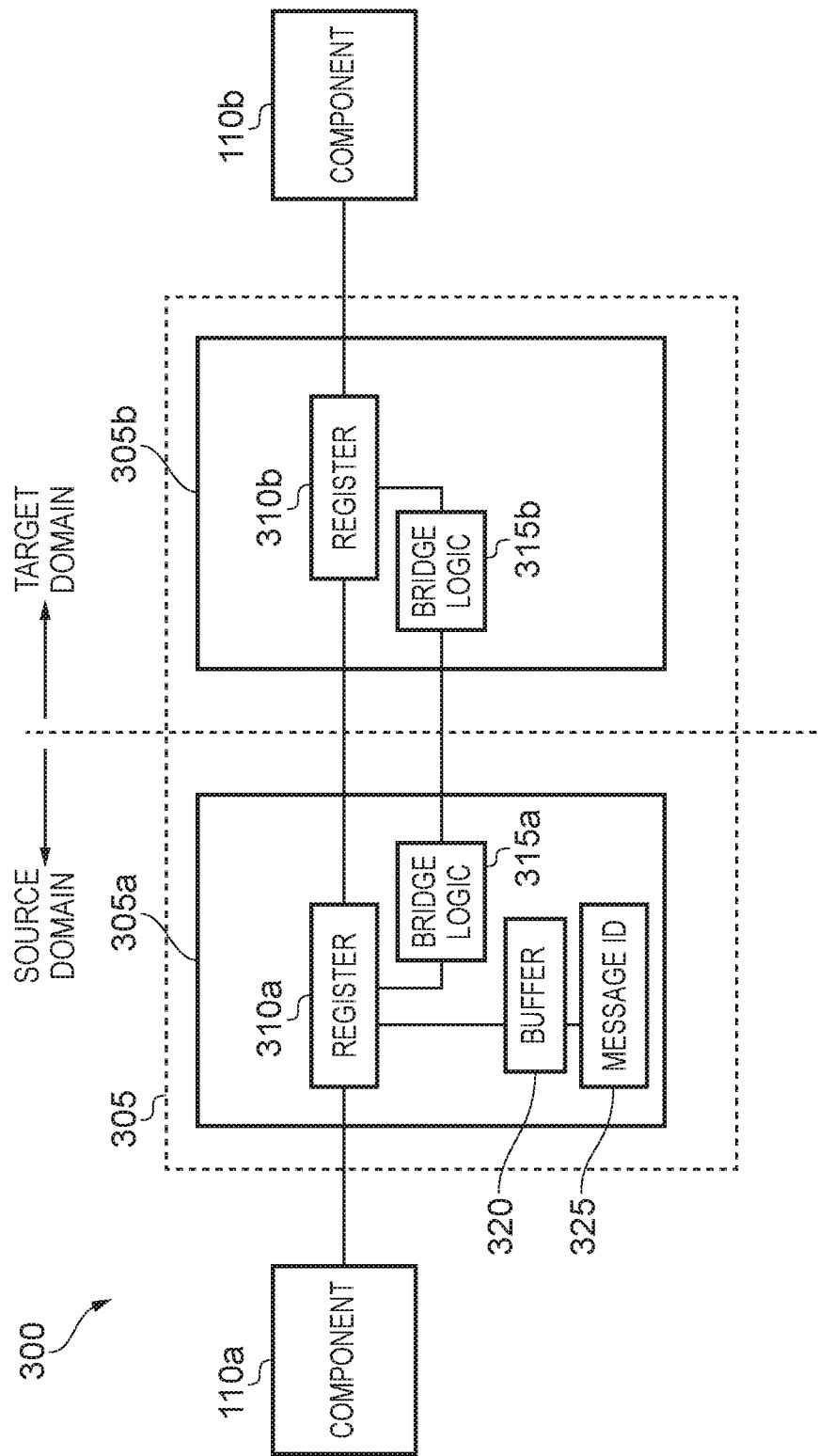
FIG. 3 schematically illustrates a system according to an example of the present disclosure.

FIG. 3 schematically illustrates a system 300 according to an example of the present disclosure. The system comprises a source component 110a in a source domain, and a target component 110b in a target domain. A first power bridge component 305a is in the source domain, and a second power bridge component 305b is in the target domain, such that each functional unit of the system 300 can be said to be in either the source domain or the target domain. The power bridge components 305a, 305b can together be considered a single power bridge 305 that straddles the source and target domains in the manner of the power bridge 105 described above in relation to FIG. 1.

The process by which a message, such as the aforementioned disconnection acceptance message, can be detected by the power bridge 305 will now be described. For simplicity of representation, this description focusses only on the transmission and detection of the disconnection acceptance message and not the other steps of the power control process as described above, but the system 300 can include power control circuitry as described above so as to implement the communication flow described above with reference to FIG. 2B. The example is illustrated in terms of transmission of messages from the source component 110a to the target component 110b, but the same functionality can be duplicated in reverse for identification of messages from the target component 110b to the source component 110a, if this is desired.

The source component 110a transmits messages to the first power bridge component 305a, for forwarding onwards to the source component. The first power bridge component 305a comprises a register 310a into which such messages are received. The second power bridge component 305b comprises a similar register 310b into which messages are to be transferred from register 310a.

The first power bridge component 315a comprises bridge logic unit 315a and, similarly, the second power bridge component 315b comprises bridge logic unit 315b. The bridge logic units communicate to control the transfer of messages from the register 310a of the first power bridge component 305a to the register 310b of the second power bridge component 310b. Messages are then transmitted from the register 310b of the second power bridge component 310b to the target component 110b.

The first power bridge component 305a comprises a buffer 320. When messages are received into the register 310a, they are copied to the buffer 320. The first power bridge component 305a further comprises message identification circuitry 325 for identifying messages that are stored in the buffer 320. This identifying includes detecting transmission of a disconnection acceptance message as explained above. The buffer 320 is thus arranged in parallel with the register 310a and bridge logic 315a, such that the identification of messages in the buffer 320 can be performed in parallel with the communication of messages through the components 305a, 305b of the power bridge 305. The identification and detection process can thus be performed without impeding the flow of messages. Any potential negative impact of the identification and detection process on the latency and speed associated with message communication is thus reduced or eliminated.

Figure 4:
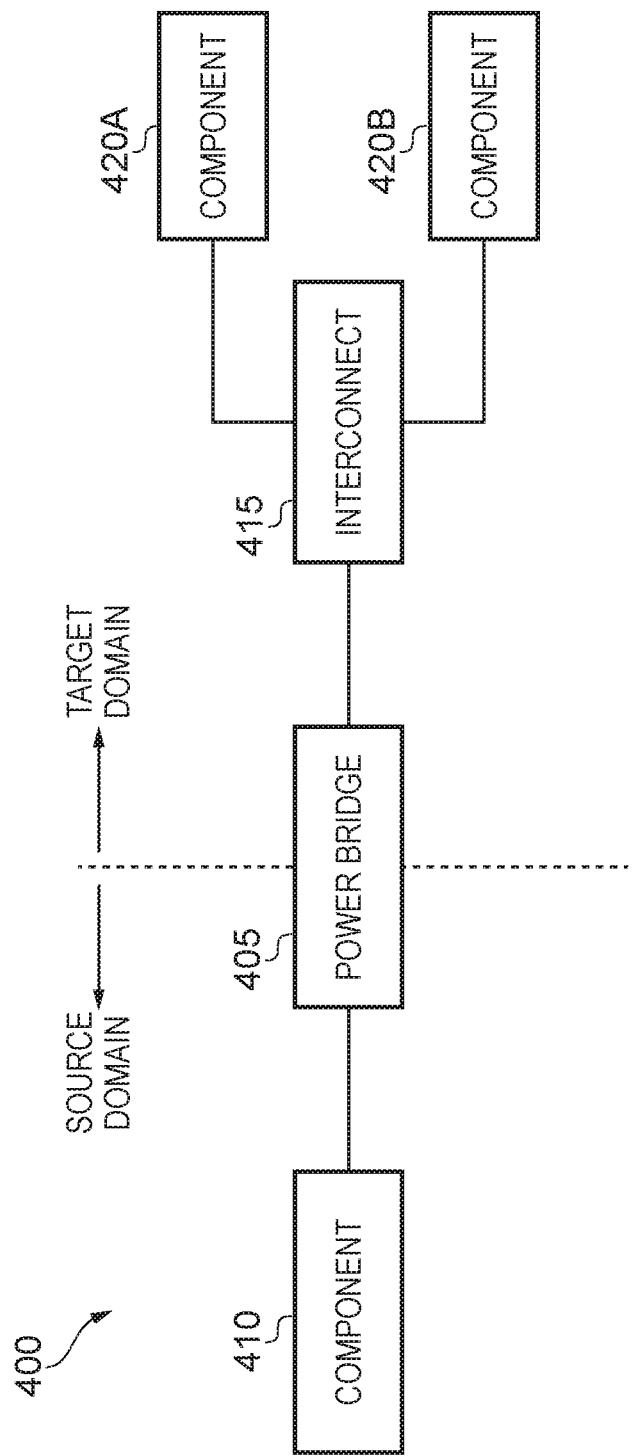
FIG. 4 schematically illustrates a system according to examples of the present disclosure.

FIG. 4 schematically illustrates a system 400 according to examples of the present disclosure. The system 400 is divided into a source power domain and a target power domain. Communication between components in the source domain and components in the target domain is conducted via a power bridge 405, which operates analogously to the examples described above.

The system 400 comprises a source component 410 in the target domain. The source component 410 is configured to interface with the power bridge 405.

The system 400 comprises an interface 415, via which the power bridge 405 interfaces with two target components 420a, 420b in the target domain. The source component 410 can thus conduct communication sessions with each target component 420a, 420b, via the power bridge 405 and the interconnect 415.

When the target domain is to be powered down, and the power bridge 405 consequently transitioned to an idle state, the system 400 follows the communication flow set out in FIG. 2A simultaneously in relation to the communication session between the source component 410 and the first target component 420a, and in relation to the communication session between the source component 410 and the second target component 420b. For simplicity of representation, a power control unit is not shown in FIG. 4.

The system 400 thus represents an extension of the system 100 of FIG. 1, to include multiple target components 420a, 420b. The target domain including these multiple target components 420a, 420b can be powered down, and the power bridge circuitry transitioned to the idle state, in the same manner as the single-component target domain of the system 100 of FIG. 1. In this manner, the system can be extended to include an arbitrarily large number of target components in the target domain and, similarly, an arbitrarily large number of source components in the source domain. In this example, the power bridge 405 maintains an indication of the open communication sessions that it is servicing. For example, the power bridge may maintain a counter of the number of open communication sessions and only initiate the transition to the idle state when the counter indicates that no communication sessions are currently being serviced.

Figure 5:
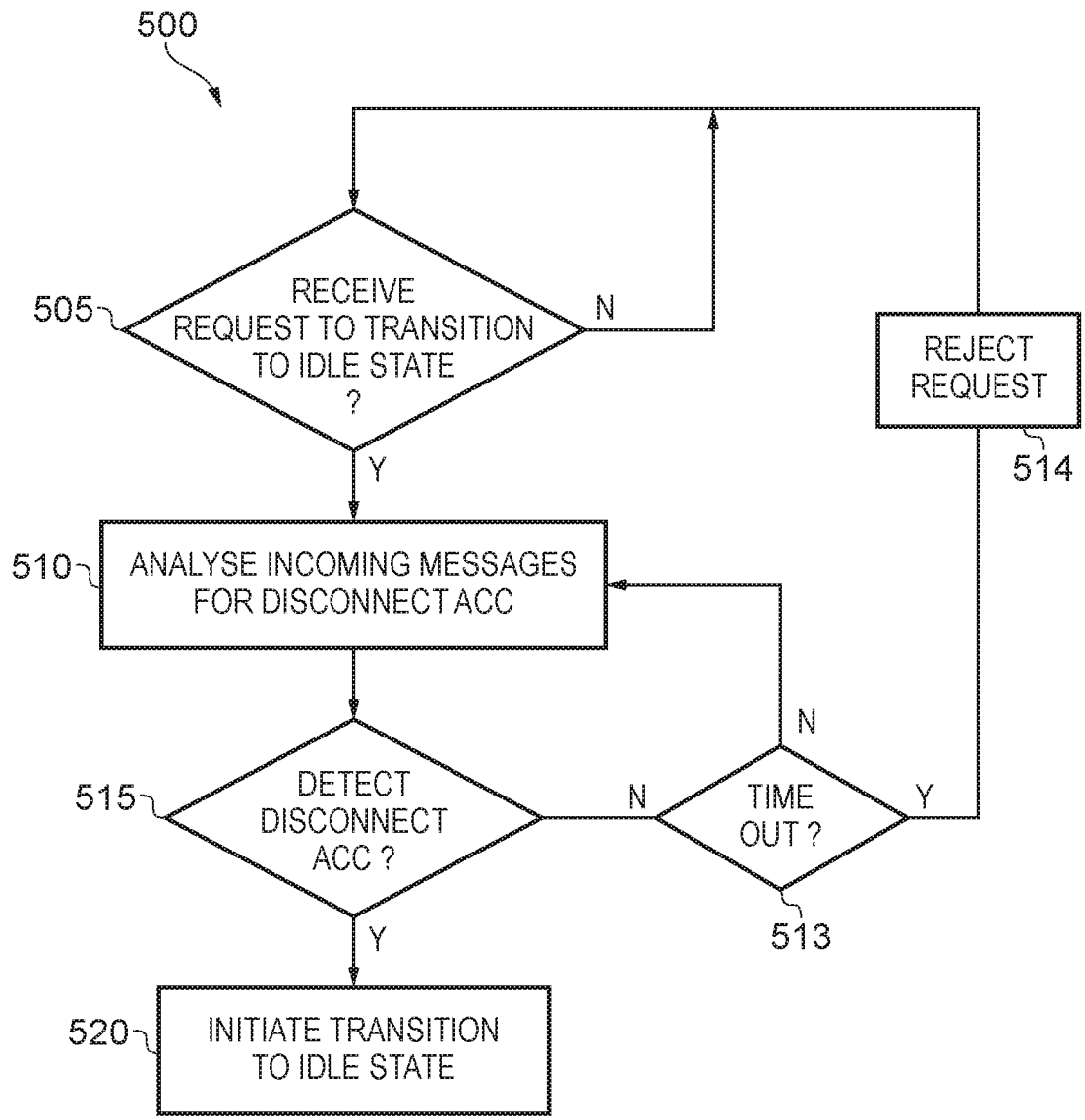
FIG. 5 depicts a method that can be implemented by a power bridge according to examples of the present disclosure.

FIG. 5 depicts a method 500 that can be implemented by a power bridge according to examples of the present disclosure.

At block 505, the power bridge awaits receipt of a request (for example from power control circuitry) to transition to an idle state. When such a request is received, flow moves to block 510.

At block 510, the power bridge analyses incoming messages that it is to communicate between components with the aim of detecting a disconnection acceptance message from a source component to a target component, as described above.

At block 515, it is determined whether a disconnection acceptance message has been detected. If a disconnection acceptance message has not been detected, flow proceeds to block 513.

At block 513, it is determined whether the time that has elapsed since the transition request was received has exceeded a threshold. If so, it is determined that the transition request has timed out and the request is rejected at block 514. Flow then returns to block 500. In this manner, a transition request that cannot be serviced (for example because a communication session between a source component and a target component cannot at that time be ceased) will not hang indefinitely but will be cancelled. In such a situation, the power bridge may send a negative acknowledgement of the transition request to a power control.

Conversely, if the elapsed time has not exceeded the threshold, it is determined that the transition request has not timed out. Flow then returns to block 510, and the power bridge continues analysing incoming messages.

Returning to block 515, if it is determined that a disconnection acceptance message has been detected, flow proceeds to block 520.

At block 520, the power bridge initiates the transition to the idle state.

Apparatuses and methods are thus provided for safely powering down of individual power domains without utilising a separate sequencer component.

From the above description it will be seen that the techniques described herein provides a number of significant benefits. In particular, the lack of a sequencer component allows a reduction in complexity and a consequent reduction in silicon and power resources, whilst still allowing safe and error-free domain-specific power control.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. Power bridge circuitry comprising:
   a first interface configured to interface with a source power domain;
   a second interface configured to interface with a target power domain;
   transition circuitry to receive a transition indication that the power bridge circuitry is to transition to an idle state;
   communication circuitry to communicate messages between the first interface and the second interface;
   message identification circuitry to identify messages communicated by the communication circuitry, the message identification circuitry being configured to detect the communication of a given message, the given message being directed to a target component connected to the second interface and indicating cessation of communication between the target component and a source component connected to the first interface,
   wherein the transition circuitry is configured, responsive to receiving the transition indication and responsive to the message identification circuitry detecting the communication of the given message, to initiate a transition of the power bridge circuitry to the idle state.

2. The power bridge circuitry of claim 1, wherein:
   the communication circuitry is responsive to receiving a disconnection request message at the second interface to communicate the disconnection request message via the first interface.

3. The power bridge circuitry of claim 1, wherein the transition indication indicates a request to transition the target power domain from a higher-power state to a lower-power state.

4. The power bridge circuitry of claim 3, wherein the transition circuitry is responsive to receiving the transition indication, and to the message identification circuitry identifying the given message, to transmit to power control circuitry a transition acknowledgement message to confirm that the target power domain is to transition from the higher-power state to the lower-power state.

5. The power bridge circuitry of claim 1, wherein:
   the message identification circuitry is configured to detect the communication of a further given message, the further given message being directed to a second target component connected to the second interface and indicating cessation of communication between the second target component and the source component, and
   wherein the transition circuitry is additionally responsive to the message identification circuitry detecting the communication of the second message to initiate the transition of the power bridge circuitry to the idle state.

6. The power bridge circuitry of claim 5, comprising connection tracking circuitry to determine connection information indicative of whether the target component has ceased communication with the source component and whether the second target component has ceased communication with the source component.

7. The power bridge circuitry of claim 6, wherein the transition circuitry is responsive to the connection information indicating that the target component has ceased communication with the source component, and that the second target component has ceased communication with the source component, to initiate the transition of the power bridge circuitry to the idle state.

8. The power bridge circuitry of claim 6, wherein the connection information is a count of a number of target components that have an un-ceased communication session with the source component.

9. The power bridge circuitry of claim 1, wherein the transition circuitry is responsive to a lack of receipt of the given message, within a predetermined time after receiving the transition indication, to reject the transition to the idle state.

10. The power bridge circuitry of claim 9, wherein the transition circuitry is configured to reject the transition by transmitting a transition rejection message to power control circuitry.

11. The power bridge circuitry of claim 1, comprising storage to store received data, wherein the message identification circuitry is configured to detect the given message by detecting whether given stored data corresponds to the given message.

12. The power bridge circuitry of claim 11, wherein:
    the storage is arranged in parallel with the communication circuitry; and
    the message identification circuitry is configured to perform said detecting in parallel with the communication of messages by the communication circuitry.

13. The power bridge circuitry of claim 1, wherein the transition circuitry is responsive to receiving the transition indication to block communication by the communication circuitry of subsequent messages between the target component and the source component, other than messages associated with the ceasing of communication between the target component and the source component.

14. A system comprising:
    power bridge circuitry comprising:
       a first interface configured to interface with a source power domain;
       a second interface configured to interface with a target power domain;
       transition circuitry to receive a transition indication that the power bridge circuitry is to transition to an idle state; and
       communication circuitry to communicate messages between the first interface and the second interface,
    a source component connected to the first interface; and
    a target component connected to the second interface, wherein:
       the power bridge further comprises message identification circuitry to identify messages communicated by the communication circuitry, the message identification circuitry being configured to detect the communication of a given message, the given message being directed to the target component and indicating cessation of communication between the target component and the source component; and the transition circuitry is configured, responsive to receiving the transition indication and responsive to the message identification circuitry detecting the communication of the given message, to initiate a transition of the power bridge circuitry to the idle state.

15. The system of claim 14, wherein:
the communication circuitry is responsive to receiving a disconnection request message at the second interface to communicate the disconnection request message to the source component via the first interface; and
the source component is responsive to receiving the disconnection request message from the first interface to issue the given message, the given message being a disconnection acceptance message.

16. The system of to claim 14, further comprising power control circuitry to transmit the transition indication to the transition circuitry.

17. The system of claim 14, further comprising a second target component connected to the second interface, wherein:
the message identification circuitry is configured to detect the communication of a further given message, the further given message being directed to the second target component and indicating cessation of communication between the second target component and the source component, and
wherein the transition circuitry is additionally responsive to the message identification circuitry detecting the communication of the second message to initiate the transition of the power bridge circuitry to the idle state.

18. The system of claim 17, wherein:
messages between the source component and the target component are associated with a first communication protocol; and
messages between the source component and the second target component are associated with a second communication protocol, the second communication protocol being different to the first communication protocol.

19. The system of claim 18, wherein the message identification circuitry comprises communication protocol interpretation circuitry configured to detect the given message and the further given message.

20. A method, in power bridge circuitry, comprising:
interfacing with a source power domain via a first interface;
interfacing with a target power domain via a second interface;
receiving a transition indication that the power bridge circuitry is to transition to an idle state;
communicating messages, via communication circuitry, between the first interface and the second interface;
detecting the communication of a given message, the given message being directed to the target component connected to the second interface and indicating cessation of communication between the target component and the source component connected to the first interface; and
responsive to receiving the request and responsive to identifying the communication of the given message, initiating a transition of the power bridge circuitry to the idle state.

* * * * *